Nov. 6, 1923.
R. L. WELLS
PIPE THIMBLE
Filed June 16, 1921
1,472,819
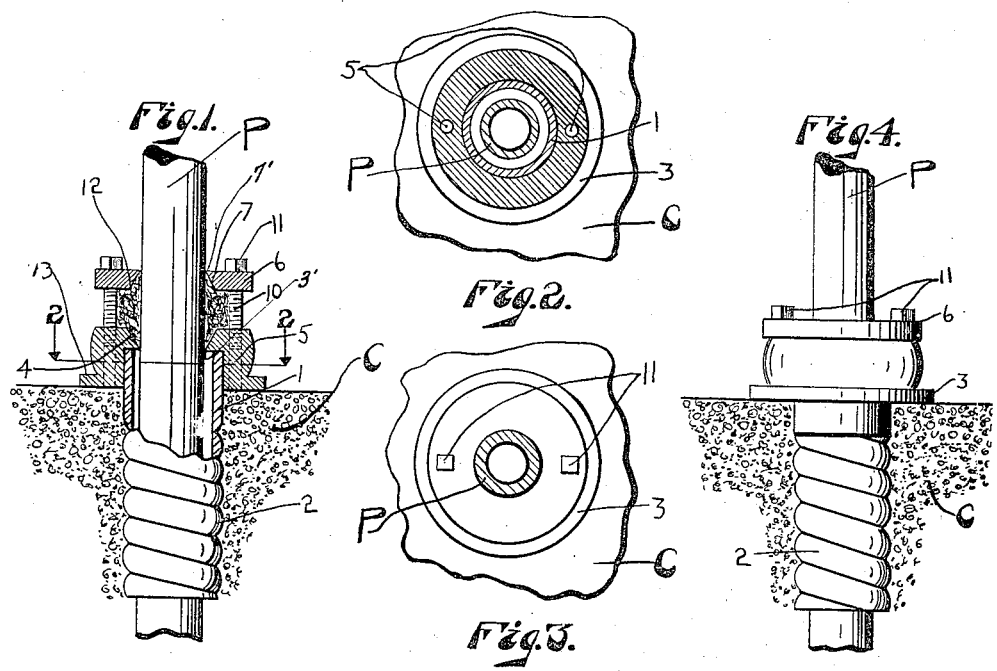
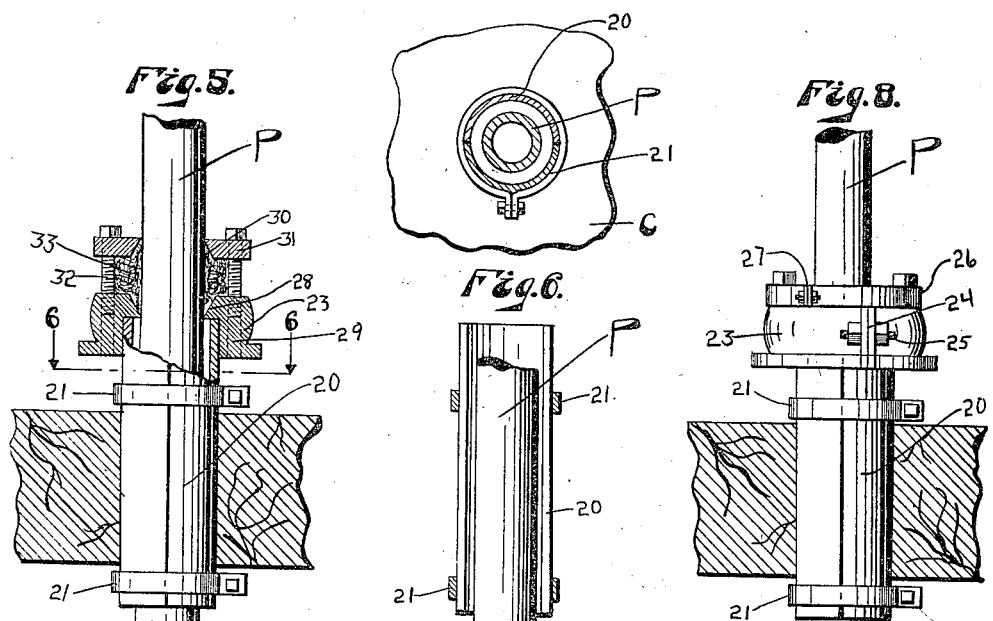
Witnesses,
H. S. Clark.
H. J. Weidman
Inventor,
Robert L. Wells,
By Joshua R. H. Potts
His Attorney.

Patented Nov. 6, 1923.

1,472,819

UNITED STATES PATENT OFFICE.

ROBERT L. WELLS, OF CHICAGO, ILLINOIS.

PIPE THIMBLE.

Application filed June 16, 1921. Serial No. 477,948.

*To all whom it may concern:*

Be it known that I, ROBERT L. WELLS, a citizen of the United States, and a resident of the city of Chicago, county of Cook, and State of Illinois, have invented certain new and useful Improvements in Pipe Thimbles, of which the following is a specification.

This invention relates to a water-tight joint, and has for its object the provision of a closable sleeve adapted to be disposed about a pipe at a point where it passes through a floor, ceiling or the like, for the purpose of preventing the leakage of water through the space ordinarily surrounding said pipe.

It is well known that water or other pipes are subject to expansion and contraction due to changes in temperature; therefore when installing such pipes in various buildings, a space is usually left about such pipes to allow for such expansion and contraction. When washing or scrubbing floors or the like, etc., particularly in canneries, garages and other establishments where the floors thereof are usually washed by directing a stream of water from a hose thereonto, hitherto it has been impossible to prevent the passage or seepage of water around pipes which may be installed in such buildings. My invention provides a water-tight fitting adapted to be disposed about such pipe to prevent water passing through the floor around said pipe.

Other objects will appear hereinafter.

The invention consists in the combinations and arrangements of parts hereinafter described and claimed.

The invention will be best understood by reference to the accompanying drawings forming a part of this specification, and in which, Fig. 1 is a sectional side elevation of my device in inoperative position;

Fig. 2 is a section on the line 2—2, Fig. 1;

Fig. 3 is a top plan view of my device showing the pipe in section;

Fig. 4 is a side elevation of my invention in operative position;

Fig. 5 is a sectional side elevation showing a modification of my device;

Fig. 6 is a sectional view on the line 6—6, Fig. 5;

Fig. 7 is a detail view showing one portion of the sleeve disposed about a pipe; and Fig. 8 is another view of said modification showing the device in operative position.

My invention is primarily adapted to be installed when the pipes are installed, and the preferred form of construction consists of a tubular sleeve 1. This sleeve may have corrugations as shown at 2 to provide a surface which when embedded in concrete or the like will form a water-tight connection, but such corrugations are not necessary and may be dispensed with if desired. The sleeve 1 is installed at the point at which it is desired to install the pipe. As shown in Fig. 1, the sleeve is embedded in concrete "C".

At the upper end of the sleeve 1, I preferably provide a member 3 which may be of any desired construction but preferably is in the form of a flanged ring which has a bore 3' through which a pipe "P" is passed and also preferably has an outwardly flared counter-bore 4. The member 3 may be fastened to the sleeve 1 in any suitable manner so as to provide a water-tight connection. The member 3 is also provided with threaded bores 5, as shown, for the reception of the threaded ends of screws hereinafter described.

Co-operating with said member 3 is a plate 6 which may be of any desirable construction but preferably has a bore 7' and a flared counter-bore 7 opposite and corresponding to said counter-bore 4. The plate 6 is also preferably provided with bores which are engaged by screws 10 preferably of brass, the lower threaded ends of said screws 10 engaging the bores 5. The heads 11 of such screws may be turned by any suitable wrench to move the plate into operative engagement with the member 3.

A section of piping "P" is inserted through said sleeve, ring and plate and connected with the other sections of piping. Packing 12 of any suitable kind, preferably asbestos, is placed between the member 3 and the plate 6, as shown in Fig. 1. The screws 10 are now driven home squeezing and crushing the packing 12 between the plate 6 and ring 3, the packing being mashed by such closing movement of said plate and cap into the counter-bores 4 and 7, respectively, and about the pipe "P," thereby forming a water-tight joint about said pipe.

In Figs. 5 to 8, inclusive, I have shown a modification of my invention to be used when pipes "P" is already installed. In this construction, the sleeve is split so that same may be placed about said pipe and fastened in position by any suitable means. I preferably provide straps 21, as shown, which are placed about said sleeve when same is in position to fasten the parts together. The member 23 is also split, as shown in Fig. 8, and is provided with one or more sets of ears 24 through which passes a bolt 25 having a suitable nut to hold the member 23 together after it has been placed on the pipe. The plate 26 likewise is split and has ears 27 on one or both sides as may be necessary to hold it in position. The member 23 is provided with a counter-bore 28 and the plate with a counter-bore 30, these parts being similar to those above described, and these members also have bores 29 and 31, respectively, engaged by screws 32. A packing 33 of any suitable material is placed between said member 23 and plate and the screws driven home, compressing the packing about said pipe and in said counter-bores to form a water-tight connection as above described.

My device is small, simple and neat in construction and may be manufactured cheaply and quickly and when installed provides an absolutely water-tight connection.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. The combination with a floor, of a pipe freely extending through said floor, to permit expansion and contraction thereof; a sleeve imbedded in said floor, so as to surround said pipe, and being spaced therefrom, said sleeve extending to a point above said floor; a member mounted on the outer end of said sleeve, and spaced from said pipe; a second member disposed about said pipe and spaced therefrom; yieldable packing material disposed between said members; and means for drawing said second member toward said first member to press the packing into yieldable engagement about said pipe, substantially as described.

2. The combination with a floor, of a pipe freely extending through said floor, said pipe being subject to expansion and contraction; a sleeve imbedded in said floor so as to surround said pipe, and being spaced therefrom to permit expansion and contraction of said pipe, said sleeve extending to a point above said floor; a member mounted on the portion of said sleeve extending above said floor, said member having an outwardly flared bore disposed about said pipe and spaced therefrom; a second member having an oppositely flared bore disposed about said pipe; packing material disposed between said members; and means for drawing said members together to compress said packing material into yieldable engagement about said pipe, substantially as described.

In testimony whereof I have signed my name to this specification in the presence of two subscribing witnesses.

ROBERT L. WELLS.

Witnesses:
R. H. BRADLEY,
ARTHUR H. EDGAR.